United States Patent
Picou et al.

(10) Patent No.: US 11,813,583 B2
(45) Date of Patent: Nov. 14, 2023

(54) SLURRY LOOP REACTOR BAD CATALYST RANGE CONTROL

(71) Applicant: ExxonMobil Chemical Patents Inc., Baytown, TX (US)

(72) Inventors: Douglas J. Picou, Baton Rouge, LA (US); Keith W. Trapp, Kingwood, TX (US); Asha C. Quant, Houston, TX (US); Ariana L. Poindexter, Houston, TX (US); Maxwell T. Mcgee, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 688 days.

(21) Appl. No.: 16/998,213

(22) Filed: Aug. 20, 2020

(65) Prior Publication Data
US 2021/0077972 A1   Mar. 18, 2021

Related U.S. Application Data

(60) Provisional application No. 62/899,821, filed on Sep. 13, 2019.

(51) Int. Cl.
| | |
|---|---|
| *B01J 19/00* | (2006.01) |
| *B01J 19/06* | (2006.01) |
| *B01J 19/24* | (2006.01) |
| *C08F 2/01* | (2006.01) |
| *C08F 2/14* | (2006.01) |

(52) U.S. Cl.
CPC ........... *B01J 19/0033* (2013.01); *B01J 19/06* (2013.01); *B01J 19/245* (2013.01); *B01J 19/2455* (2013.01); *C08F 2/01* (2013.01); *B01J 2219/0004* (2013.01); *B01J 2219/00033* (2013.01); *B01J 2219/00198* (2013.01); *B01J 2219/00231* (2013.01)

(58) Field of Classification Search
USPC .................................. 526/59, 919; 700/269
See application file for complete search history.

(56) References Cited

U.S. PATENT DOCUMENTS

| | | | |
|---|---|---|---|
| 3,152,872 | A | 10/1964 | Scottin et al. |
| 4,424,341 | A | 1/1984 | Hanson et al. |
| 6,204,344 | B1 | 3/2001 | Kendrick et al. |
| 6,818,186 | B2 | 11/2004 | Burns et al. |
| 7,645,841 | B2 | 1/2010 | Shaw et al. |
| 2003/0027945 | A1 | 2/2003 | Kufeld et al. |
| 2010/0317812 | A1 | 12/2010 | Towles |
| 2012/0283395 | A1* | 11/2012 | Hendrickson ........... B01J 8/224 422/111 |

FOREIGN PATENT DOCUMENTS

WO   PCT/US2020/014806   1/2020

OTHER PUBLICATIONS

Allemeersch, P., (Dec. 2015), "Introduction to the Slurry Loop Process", Polymerisation of Ethylene: In Slurry Loop Reactors (Dec. 31, 2015), pp. 1-18.

\* cited by examiner

*Primary Examiner* — Fred M Teskin
(74) *Attorney, Agent, or Firm* — ExxonMobil Technology and Engineering Company-Chemicals

(57) ABSTRACT

A process for maintaining an optimum polymerization process in a continuous loop polymerization reactor by driving a catalyst feed range set-point around a bad catalyst set-point range using a bad catalyst feed rate program to vary the catalyst feed rate for differing periods of time between previously determined good catalyst feed rates.

18 Claims, 2 Drawing Sheets

SLURRY LOOP REACTOR BAD CATALYST RANGE CONTROL

CROSS-REFERENCE TO RELATED APPLICATION

This application claims the benefit of U.S. Provisional Application 62/899,821 filed Sep. 13, 2019 entitled "SLURRY LOOP REACTOR BAD CATALYST RANGE CONTROL", the entirety of which is incorporated by reference herein.

FIELD

Disclosed is a process for optimizing polymerization in a continuous loop polymerization reactor by driving the catalyst range set-point through and within a bad catalyst set-point range.

BACKGROUND

Polymer production rate in slurry loop reactors is known to be affected by various reaction parameters, such as monomer feed rate, catalyst feed rate and reactor temperature. To optimize polymer production rate, one or more of these parameters may be varied. For example, if the production rate is too low, reactor temperature may be increased, within certain limits, to more thoroughly polymerize the monomer(s) within the reactor loop. But if the reactor temperature called for exceeds the limits of the reactor, it can be advantageous to increase the amount of catalyst fed to the reactor, such as by dropping catalyst more frequently into the reactor, to increase polymer production rate.

However, slurry loop reactors have certain catalyst feed rates which have been determined to cause reactor upsets. Reactor upset occurs when pockets of catalyst, known as drops, are dropped into the reactor too close to the previous catalyst drops. In a slurry loop reactor, as the rate that the drops enter the reactor is changed, the previous catalyst drop may have made one full revolution within the loop, and therefore the new catalyst drop may enter the reactor too close to the previous catalyst drop. When this happens over a period of time the reactor can develop a lump of higher density, higher temperature material in the slurry loop. This lump can cause amperage and circulation issues with the reactor pump and difficulties in controlling the reactor temperature. These catalyst feed rates are known as bad catalyst set-points. Accordingly, it is necessary to avoid setting catalyst drops within the bad catalyst set-point range, despite the fact that off-target production rates call for increasing or decreasing catalyst concentration within the polymerization loop.

Different slurry loop reactors may have different ranges of bad catalyst set-points, which are defined generally by the length of and flow rate within the reactor. Thus, bad catalyst set-point ranges are empirically determined for each reactor.

It would be advantageous to be able to drive polymer production toward a desired target even if the production rate calls for catalyst drops within the reactor's bad catalyst set-point range.

SUMMARY

Presented herein is a process for maintaining an optimum polymerization conditions in a continuous loop polymerization reactor by driving a catalyst feed range set-point around a bad catalyst set-point range, comprising if there is a non-optimum polymerization condition requiring a change in a catalyst feed rate, calculating a desired catalyst feed rate to return the process to optimum conditions, and sending the desired catalyst feed rate to a bad catalyst program for determining whether the desired catalyst feed rate falls within a bad catalyst feed rate set-point range. If the desired catalyst feed rate is determined to fall within the bad catalyst feed rate set-point range, turning over control of the catalyst feed rate to the bad catalyst program, wherein the bad catalyst program controls and incrementally changes the catalyst feed rate set-point delivered by a semi-continuous shot feeder between previously established first and second good catalyst feed rate set-points, above and below the bad catalyst feed rate set-point range, so that an average catalyst feed rate is equivalent to the desired catalyst feed rate set-point within the bad catalyst feed rate set-point range.

In one form, the bad catalyst program determines a first period of time required for the catalyst feed rate to remain at the first good catalyst feed rate set-point, and a second period of time required for the catalyst feed rate to remain at the second good catalyst feed rate set-point, to establish a time-weighted average catalyst feed rate which is equivalent to the desired catalyst feed rate set-point within the bad catalyst feed rate set-point range.

In another form, the bad catalyst program changes the catalyst feed rate by executing the first good catalyst feed set-point for the first period of time, and executing the second good catalyst feed set-point for the second period of time, and wherein the first and second periods of time are different. For example, the period of time spent at each good catalyst feed rate set-point is from 1 to 90 minutes, or from 5 to 60 minutes.

In yet another form, the duration of the time-weighted average changes as a function of production rate with larger time-weighted averages at higher production rates, or the duration of the time-weighted average changes as a function of the span of the bad catalyst feed range with larger time-weighted averages at larger bad catalyst feed ranges.

Advantageously, the period of time spent at each good catalyst feed rate set-point is completed before the controller changes to a new desired catalyst feed rate.

In one form, the desired catalyst feed rate set-point is manually entered into the bad catalyst program. Alternatively, the desired catalyst feed rate set-point is calculated by an external processor program and automatically entered into the bad catalyst program by the process controller.

In some forms, the catalyst feed rate change is needed due to a non-optimum polymer production rate or a non-optimum polymer quality.

In yet another form, the catalyst feed rate is changed in increments of at least 0.01 drops per minute, such as at least 0.02 drops per minute, or 0.2 drops per minute, or even 0.40 drops per minute.

Conveniently, once the desired catalyst feed rate reaches one of the previously established good catalyst feed rate set-points, the bad catalyst program is terminated and catalyst feed rate control is returned to the normal process controller.

In another form, the continuous loop polymerization reactor can be a single slurry loop reactor, or two or more slurry loop reactors connected in series.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

DETAILED DESCRIPTION

Figure 1:
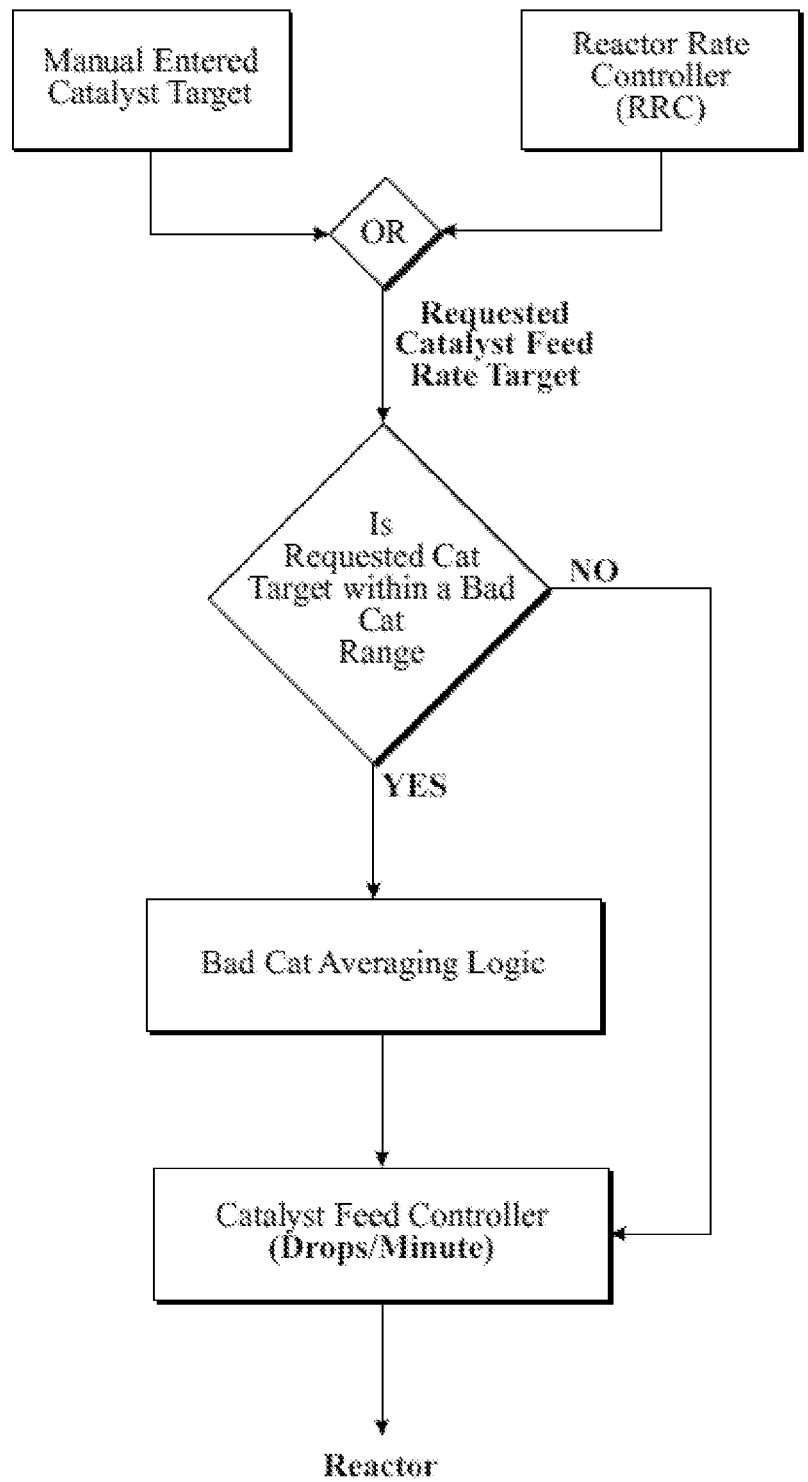
FIG. 1 is a logic chart describing the presently disclosed process.

There is an increased interest in developing a process for maintaining an optimum polymerization process in a continuous loop polymerization reactor by driving the catalyst feed range set-point around a bad catalyst set-point range. The present disclosure is directed to a bad catalyst program which enables control of catalyst drops into a continuous loop polymerization reactor to recreate catalyst feed rates within the reactor which are equivalent to catalyst drops within a bad catalyst set-point range, without actually having the catalyst feed rate set within the bad catalyst set-point range.

Definitions

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any device or method or system described herein can be comprised of, can consist of, or can consist essentially of any one or more of the described elements.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds). In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

Aspects of the present invention are described herein with reference to flowchart illustrations and/or block diagrams of methods, apparatus (systems), and computer program products according to embodiments of the invention. It will be understood that at least some of the blocks of the flowchart illustrations and/or block diagrams, and combinations of blocks in the flowchart illustrations and/or block diagrams, can be implemented by computer readable program instructions.

Certain forms disclosed herein are implemented by performing steps or procedures, and sub-steps or sub-procedures, in a manner selected from the group consisting of manually, semi-automatically, fully automatically, and combinations thereof, involving use and operation of system units, system sub-units, devices, assemblies, sub-assemblies, mechanisms, structures, components, and elements, and, peripheral equipment, utilities, accessories, and materials. Moreover, according to actual steps or procedures, sub-steps or sub-procedures, system units, system sub-units, devices, assemblies, sub-assemblies, mechanisms, structures, components, and elements, and, peripheral equipment, utilities, accessories, and materials, used for implementing a particular form, the steps or procedures, and sub-steps or sub-procedures are performed by using hardware, software, and/or an integrated combination thereof, and the system units, sub-units, devices, assemblies, sub-assemblies, mechanisms, structures, components, and elements, and peripheral equipment, utilities, accessories, and materials, operate by using hardware, software, and/or an integrated combination thereof.

For example, software used, via an operating system, for implementing certain forms disclosed herein can include operatively interfaced, integrated, connected, and/or functioning written and/or printed data, in the form of software programs, software routines, software subroutines, software symbolic languages, software code, software instructions or protocols, software algorithms, or a combination thereof. For example, hardware used for implementing certain forms disclosed herein can include operatively interfaced, integrated, connected, and/or functioning electrical, electronic and/or electromechanical system units, sub-units, devices, assemblies, sub-assemblies, mechanisms, structures, components, and elements, and, peripheral equipment, utilities, accessories, and materials, which may include one or more computer chips, integrated circuits, electronic circuits, electronic sub-circuits, hard-wired electrical circuits, or a combination thereof, involving digital and/or analog operations. Certain forms disclosed herein can be implemented by using an integrated combination of the just described exemplary software and hardware.

In certain forms disclosed herein, steps or procedures, and sub-steps or sub-procedures can be performed by a data processor, such as a computing platform, for executing a plurality of instructions. Optionally, the data processor includes volatile memory for storing instructions and/or data, and/or includes non-volatile storage, for example, a magnetic hard-disk and/or removable media, for storing instructions and/or data. Optionally, certain forms disclosed herein include a network connection. Optionally, certain forms disclosed herein include a display device and a user input device, such as a touch screen device, keyboard and/or mouse.

Presented herein is a process for maintaining optimum polymerization conditions in a continuous loop polymerization reactor when a process control program calls for a catalyst feed set-point within a bad catalyst set-point range, as generally illustrated in FIG. 1. A process controller, which is a computer processor interfaced with various hardware elements to monitor and control the continuous loop reactor, measures various conditions during polymerization, such as the production rate and/or the quality of a polymer in the continuous loop polymerization process. If the conditions measured are outside of a previously determined target range, then a change in a catalyst feed rate is calculated. The catalyst feed to the reactor is conducted with a semi-continuous shot feeder, which is a ball-valve filled with catalyst and then emptied into the polymerization reactor by turning the ball-valve at a predetermined speed, measured in turns or drops per unit time, usually in drops per minute. The newly desired catalyst feed rate is then sent to a bad catalyst program for determining whether the newly desired catalyst feed rate falls within a bad catalyst feed rate set-point range. If the desired catalyst feed rate is determined to fall within the bad catalyst feed rate set-point range, the process controller turns over control of the catalyst feed rate to the bad catalyst program, and the bad catalyst program controls and incrementally changes the catalyst feed rate set-point, between previously established first and second good catalyst feed rate set-points to obtain an average catalyst feed rate. The first and second good catalyst feed rates are values above and below the bad catalyst feed rate set-point range, and the average catalyst feed rate is equivalent to the desired catalyst feed rate set-point within the bad catalyst feed rate set-point range. In this way, the overall catalyst content in the reactor is increased or decreased, without passing through the bad catalyst feed rate set-point range.

The bad catalyst program determines a first period of time required for the catalyst feed rate to remain at the first good catalyst feed rate set-point, and a second period of time required for the catalyst feed rate to remain at the second good catalyst feed rate set-point, to establish a time-weighted average catalyst feed rate which is equivalent to the desired catalyst feed rate set-point within the bad catalyst feed rate set-point range. The bad catalyst program changes the catalyst feed rate by executing the first good catalyst feed set-point for the first period of time, and executing the second good catalyst feed set-point for the second period of time. The first and second periods of time are different. For example, the period of time spent at each good catalyst feed rate set-point is from 1 to 90 minutes, or from 5 to 60 minutes. The period of time spent at each good catalyst feed rate set-point should be completed before the controller changes to a new desired catalyst feed rate.

The desired catalyst feed rate set-point, usually measured in drops per unit time, can be manually entered into the bad catalyst program, or can be calculated by an external processor program and automatically entered into the bad catalyst program by the process controller.

A catalyst feed rate change can be needed due to non-optimum polymer production rate or non-optimum polymer quality. After each change in the catalyst feed rate, the polymer production rate can be measured by a mass or energy balance, or a combination of both utilizing flow rates of incoming polymerization reactor feeds including monomer flow rate, comonomer flow rate and/or hydrogen flow rate, or by heat of reaction as measured by the flow rate and temperature of a heat removal medium, such as cooling water for the reactor. Additionally, the polymer quality can be assessed by measuring its melt index and/or ash content.

Figure 2:
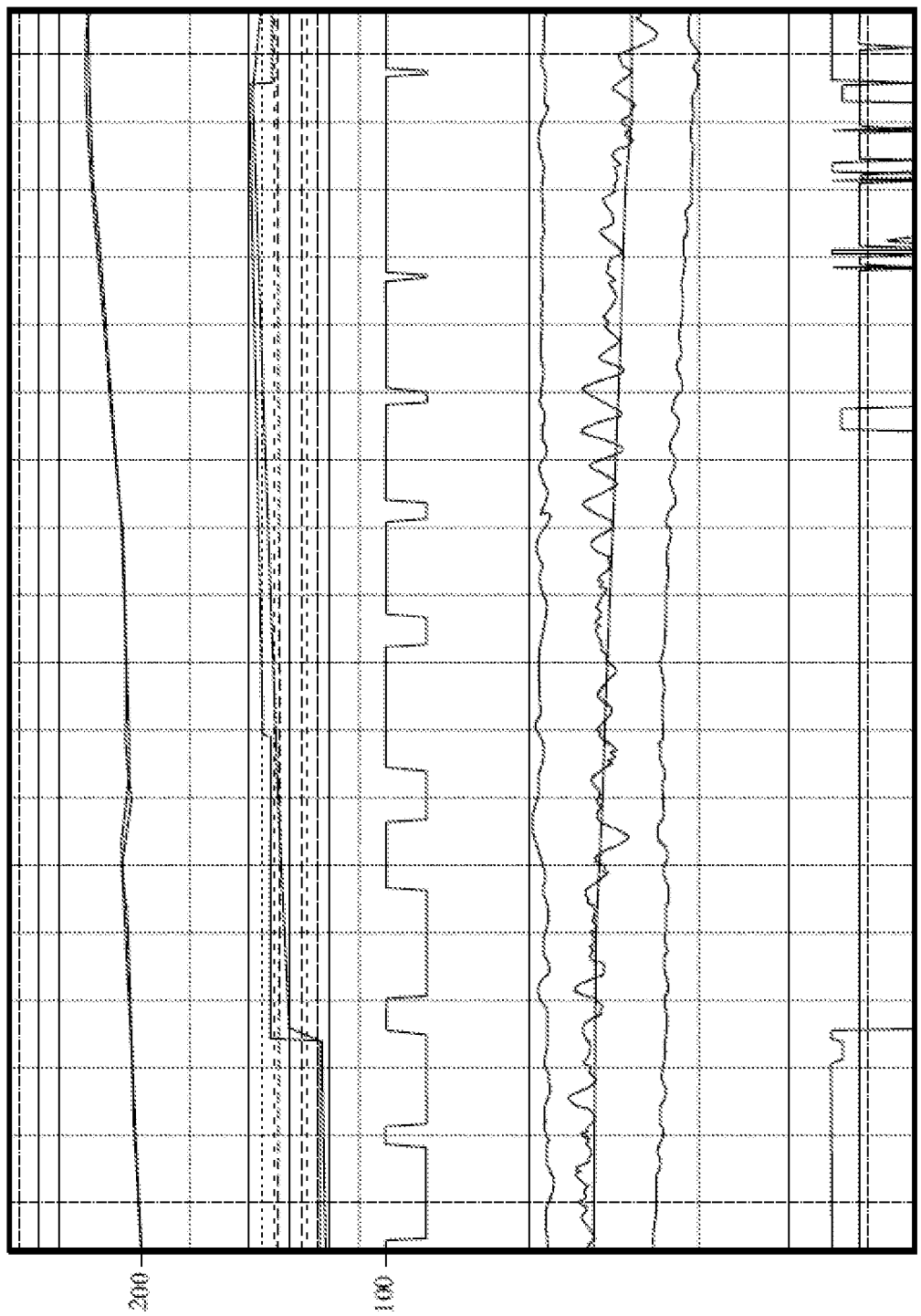
FIG. 2 is a multi-day tracing of various reaction and product parameters, illustrating the effects of the bad catalyst program described herein.

FIG. 2 is a multi-day tracing of various reaction and product parameters for a continuous loop reactor, illustrating the effects of the bad catalyst program described herein. The catalyst feed rate-set point is designated as line 100, which can be seen as making step rate changes in catalyst feed rate, thus avoiding operating within a bad catalyst feed rate range. Line 200 indicates the polymer production rate, which increases over a period of time due to the modification of catalyst feed rate 100.

The bad catalyst program changes the catalyst feed rate in increments of at least 0.01 drops per minute, or at least 0.02 drops per minute, or even 0.03 drops per minute, or 0.20 drops per minute, or even up to 0.40 drops per minute. In some instances, the bad catalyst program can skip incremental steps, based upon monitoring and feedback of the polymer production rate by the process controller or polymer quality. In any event, once a catalyst feed rate and time are executed by the bad catalyst program, that increment should be completed before initiating a new increment.

Once the desired catalyst feed rate reaches one of the previously established good catalyst feed rate set-points, the bad catalyst program is terminated and catalyst feed rate control is returned to the normal process controller.

Advantageously, the presently disclosed process can be applied to single slurry loop reactors, or multiple slurry loop reactors, such as two loop reactors, operated either in parallel or in series.

Further illustrative, non-exclusive examples of systems and methods according to the present disclosure are presented in the following enumerated paragraphs. It is within the scope of the present disclosure that an individual step of a method recited herein, including in it) the following enumerated paragraphs, may additionally or alternatively be referred to as a "step for" performing the recited action.

PCT1. A process for maintaining an optimum polymerization conditions in a continuous loop polymerization reactor by driving a catalyst feed range set-point around a bad catalyst set-point range, comprising if there is a non-optimum polymerization condition requiring a change in a catalyst feed rate, calculating a desired catalyst feed rate to return the process to optimum conditions, sending the desired catalyst feed rate to a bad catalyst program for determining whether the desired catalyst feed rate falls within a bad catalyst feed rate set-point range, if the desired catalyst feed rate is determined to fall within the bad catalyst feed rate set-point range, turning over control of the catalyst feed rate to the bad catalyst program, wherein the bad catalyst program controls and incrementally changes the catalyst feed rate set-point delivered by a semi-continuous shot feeder between previously established first and second good catalyst feed rate set-points, above and below the bad catalyst feed rate set-point range, so that an average catalyst feed rate is equivalent to the desired catalyst feed rate set-point within the bad catalyst feed rate set-point range.

PCT2. The process of paragraph PCT1, wherein the bad catalyst program determines a first period of time required for the catalyst feed rate to remain at the first good catalyst feed rate set-point, and a second period of time required for the catalyst feed rate to remain at the second good catalyst feed rate set-point, to establish a time-weighted average catalyst feed rate which is equivalent to the desired catalyst feed rate set-point within the bad catalyst feed rate set-point range.

PCT3. The process of paragraph PCT2, wherein the bad catalyst program changes the catalyst feed rate by executing the first good catalyst feed set-point for the first period of time, and executing the second good catalyst feed set-point for the second period of time, and wherein the first and second periods of time are different.

PCT4. The process of paragraph PCT2, wherein the duration of the time-weighted average changes as a function of production rate with larger time-weighted averages at higher production rates, and/or the duration of the time-weighted average changes as a function of the span of the bad catalyst feed range with larger time-weighted averages at larger bad catalyst feed ranges.

PCT5. The process of any of paragraphs PCT2 to PCT4, wherein the period of time spent at each good catalyst feed rate set-point is from 1 to 90 minutes, or from 5 to 60 minutes.

PCT6. The process of any of paragraphs PCT2 to PCT5, wherein the period of time spent at each good catalyst feed rate set-point is completed before the controller changes to a new desired catalyst feed rate.

PCT7. The process of any of paragraphs PCT1 to PCT6, wherein the desired catalyst feed rate set-point in drops per unit time is manually entered into the bad catalyst program, or is calculated by an external processor program and automatically entered into the bad catalyst program by the process controller.

PCT8. The process of any of paragraphs PCT1 to PCT7, wherein the catalyst feed rate change is needed due to non-optimum polymer production rate or non-optimum polymer quality.

PCT9. The process of any of paragraphs PCT1 to PCT8, wherein the catalyst feed rate is changed in increments of at least 0.01 drops per minute.

PCT10. The process of any of paragraphs PCT1 to PCT9, wherein once the desired catalyst feed rate reaches one of the previously established good catalyst feed rate set-points, the bad catalyst program is terminated and catalyst feed rate control is returned to the normal process controller.

PCT11. The process of any of paragraphs PCT1 to PCT10, wherein the continuous loop polymerization reactor is a single slurry loop reactor, or two or more slurry loop reactors connected in series.

INDUSTRIAL APPLICABILITY

The systems and methods disclosed herein are applicable to the polymer industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A process for maintaining an optimum polymerization conditions in a continuous loop polymerization reactor by driving a catalyst feed range set-point around a bad catalyst set-point range, comprising:
   determining a non-optimum polymerization condition requiring a change in a catalyst feed rate has occurred;
   in response to said determining, calculating a desired catalyst feed rate to return the process to optimum conditions;
   sending the calculated desired catalyst feed rate to a bad catalyst program for determining whether the desired catalyst feed rate falls within a bad catalyst feed rate set-point range;
   if the desired catalyst feed rate is determined to fall within the bad catalyst feed rate set-point range, turning over control of the catalyst feed rate to the bad catalyst program,
   wherein the bad catalyst program controls and incrementally changes the catalyst feed rate set-point delivered by a semi-continuous shot feeder between previously established first and second good catalyst feed rate set-points, above and below the bad catalyst feed rate set-point range, so that an average catalyst feed rate is equivalent to the desired catalyst feed rate set-point within the bad catalyst feed rate set-point range.

2. The process of claim 1, wherein the bad catalyst program determines a first period of time required for the catalyst feed rate to remain at the first good catalyst feed rate set-point, and a second period of time required for the catalyst feed rate to remain at the second good catalyst feed rate set-point, to establish a time-weighted average catalyst feed rate which is equivalent to the desired catalyst feed rate set-point within the bad catalyst feed rate set-point range.

3. The process of claim 2, wherein the bad catalyst program changes the catalyst feed rate by executing the first good catalyst feed set-point for the first period of time, and executing the second good catalyst feed set-point for the second period of time, and wherein the first and second periods of time are different.

4. The process of claim 2, wherein the duration of the time-weighted average changes as a function of polymer production rate, with larger time-weighted averages at higher production rates.

5. The process of claim 2, wherein the duration of the time-weighted average changes as a function of a span of the bad catalyst feed range, with larger time-weighted averages at larger bad catalyst feed ranges.

6. The process of claim 2, wherein the period of time spent at each good catalyst feed rate set-point is from 1 to 90 minutes.

7. The process of claim 2, wherein the period of time spent at each good catalyst feed rate set-point is from 5 to 60 minutes.

8. The process of claim 2, wherein the period of time spent at each good catalyst feed rate set-point is completed before the controller changes to a new desired catalyst feed rate.

9. The process of claim 1, wherein the desired catalyst feed rate set-point is manually entered into the bad catalyst program.

10. The process of claim 1, wherein the desired catalyst feed rate set-point is calculated by an external processor program and automatically entered into the bad catalyst program by the process controller.

11. The process of claim 1, wherein the determined non-optimum polymerization condition is non-optimum polymer production rate or non-optimum polymer quality.

12. The process of claim 1, wherein the catalyst feed rate is changed in increments of at least 0.01 drops per minute.

13. The process of claim 1, wherein once the desired catalyst feed rate reaches one of the previously established good catalyst feed rate set-points, the bad catalyst program is terminated and catalyst feed rate control is returned to a normal process controller.

14. The process of claim 1, wherein the continuous loop polymerization reactor is a single slurry loop reactor.

15. The process of claim 1, wherein the continuous loop polymerization reactor is two or more slurry loop reactors connected in series.

16. The process of claim 1, wherein determining the non-optimum polymerization condition requiring a change in a catalyst feed rate comprises measuring a polymerization condition and determining that the polymerization condition is outside of a previously determined target range for said polymerization condition.

17. The process of claim 16, wherein the non-optimum polymerization condition is non-optimum polymer production rate.

18. The process of claim 16, wherein the non-optimum polymerization condition is non-optimum polymer quality.

* * * * *